Dec. 9, 1952　　　　G. L. DU ROSTU　　　　2,620,900
ELECTROMAGNETIC BRAKING DEVICE
Filed July 20, 1948　　　　　　　　　　　　3 Sheets-Sheet 1

INVENTOR
GEORGES LEVESQUE DUROSTU
BY
Robert E Burns
ATTORNEY

Dec. 9, 1952   G. L. DU ROSTU   2,620,900
ELECTROMAGNETIC BRAKING DEVICE
Filed July 20, 1948   3 Sheets-Sheet 2

INVENTOR
GEORGES LEVESQUE DU ROSTU
BY
*Robert E. Burns*
ATTORNEY

Patented Dec. 9, 1952

2,620,900

UNITED STATES PATENT OFFICE 2,620,900

ELECTROMAGNETIC BRAKING DEVICE

Georges Levesque Du Rostu, Paris, France, assignor to Societe Anonyme Andre Citroen, Paris, France Application July 20, 1948, Serial No. 39,777
In France July 23, 1947

2 Claims. (Cl. 188—164)

A great many braking devices have already been proposed which are applicable to all kinds of machines and more particularly to vehicles. As a rule, they are so designed that they can safely absorb the power of the system with which they are coupled although frequently they are not sufficiently cooled that they can absorb a considerable excess power over a comparatively long period, for instance for the purpose of controlling the speed of an automobile coasting on a long down grade.

This invention aims at providing braking means which make it possible to throw the engine out of gear while running down grade and at the same time absorb the power without overheating. The braking means in accordance with the invention may be arranged at any point between the transmission gears and the wheels or directly on the latter, e. g. at the center of the brake drums with which they may be combined.

In applicant's co-pending application, Serial No. 706,024 filed October 26, 1946, now Patent No. 2,512,065 dated June 20, 1950, there has been described a clutch which operates by frictional engagement between two sets of rings connected respectively to the driving and driven part and positioned in the field of a fixed electromagnet of U-section surrounding the rings.

The present invention relates to a somewhat similar assembly for use in decelerating a rotary member relative to a fixed member by the friction of a first set of longitudinally loose magnetic metal rings splined on said rotary member against a further set of likewise longitudinally loose magnetic metal rings splined in said fixed member.

The fixed member consists of an annular yoke which is U-shaped in radial-axial section with the legs of the U approximately parallel to the axis. An electromagnet-energizing coil is housed in the bottom of said U-sectioned yoke. Splined in the inside of the outer leg of said U-sectioned yoke are the said rings carried by the fixed member, which consequently project inwardly.

The movable member comprises a cup-shaped part the skirt of which extends between the cylindrical legs of the U-sectioned yoke. Splined on the outside of said cup-shaped part are the said rings carried thereby and which consequently project outwardly. The rings carried by the movable member are interleaved with the ones carried by the fixed member.

The inner disc and ring are keyed on a hollow shaft concentric with that of the annular U-sectional electromagnet and have channels provided therein to lead the cooling liquid from the hollow shaft into the spaces between the rings through apertures communicating with the channels between the bars on the ring. The liquid is circulated by the action of centrifugal force, the rotatable member acting as a whirler.

In the operation of the device the rings engage one another by pairs. The flux generated by the electromagnet coil is divided into as many fractions as there are ring pairs. Considering the flux that enters any one ring of one set and then the related ring of the other set, the magnetic attraction takes place at their common surface. Consequently, the flux crosses the gap once in its path from one ring to the other.

Figure 1:
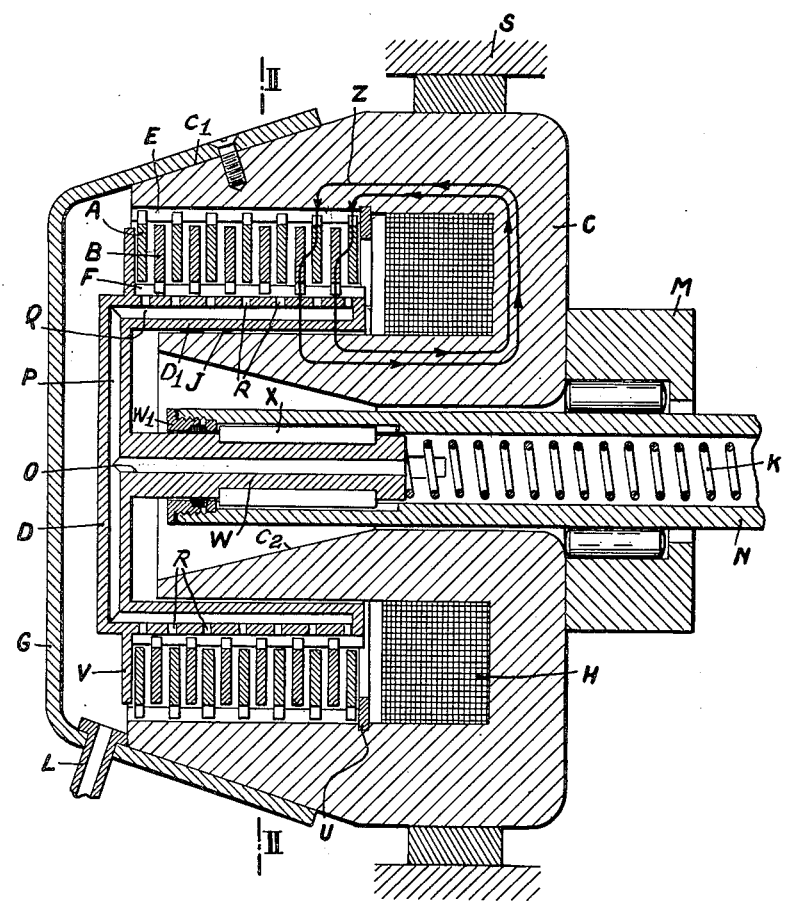
Fig. 1 is a sectional view of a preferred embodiment of the invention taken on a plane passing through the axis of the same, the spaces between the rings being exaggerated.
Figure 2:
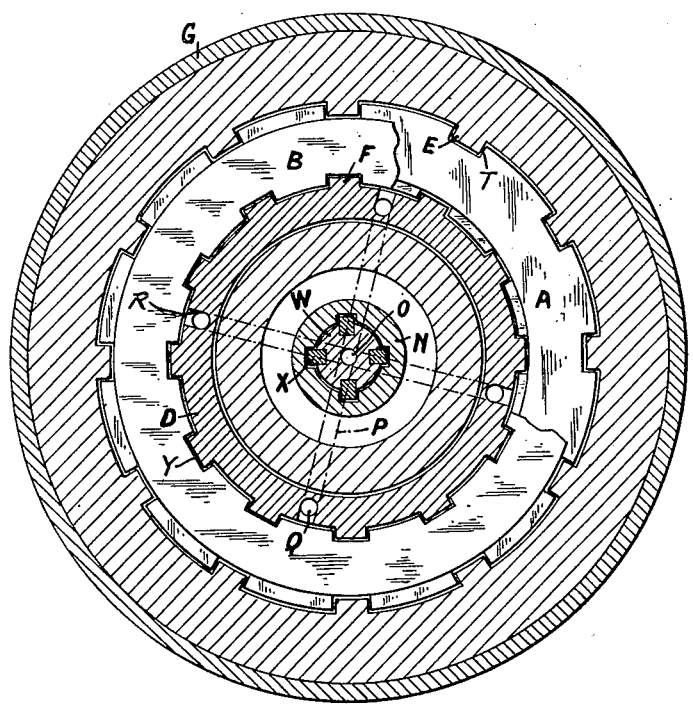
Fig. 2 is a sectional view taken in a plane perpendicular to the axis of rotation of the brake, approximately on the line II—II in Fig. 1.
Figure 3:
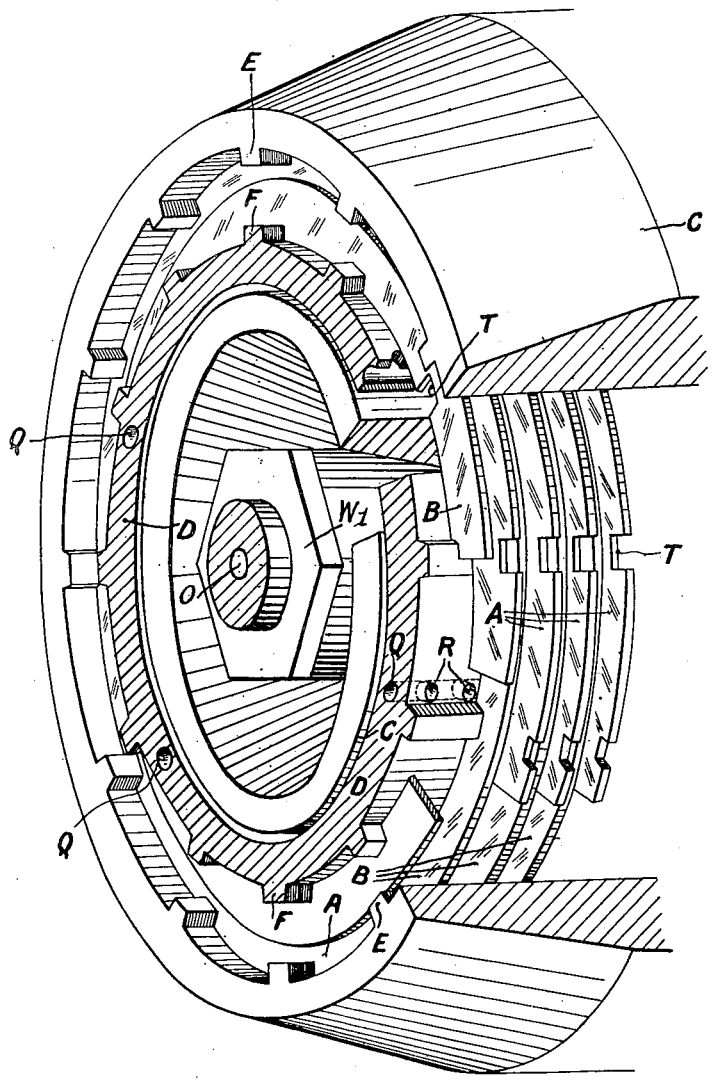
Fig. 3 is a perspective view which shows how the various ring sets are splined respectively on the movable and in the fixed member respectively, the figure being partly broken away.

The embodiment of the invention illustrated in the drawings comprises two sets of rings A and B associated, respectively, with a fixed member C and a movable member D. The fixed member C is an annular U-sectioned yoke having an outer leg $C_1$ and an inner leg $C_2$ with an annular space between the two legs. The movable member D is coaxial with the fixed member C and has an annular skirt portion $D_1$ that extends into the space between the legs $C_1$, $C_2$ of the fixed member C. The inner face of the outer leg $C_1$ of the fixed member is provided with axially extending ribs or splines E which fit into, and cooperate with, grooves T provided in the outer periphery of the rings A so that the rings A are rotationally fixed relative to the fixed member C while being slidable relative to the fixed member in an axial direction. Similarly, the outer surface of the skirt portion $D_1$ of the movable member D is provided with axially extending ribs or splines F which engage in, and cooperate with, grooves Y provided in the inner peripheries of the rings B so that these rings are caused to rotate with the movable member but are slidable relative to said member in an axial direction. The rings A alternate with the rings B so that the two sets of rings are interleaved with one another. The fixed member C is closed by a removable cover G.

The fixed member C is ferromagnetic. It contains a coil H which is stationary and has suitable terminals providing for an effective connection with an outside power source. The lines Z show the path of the magnetic flux when the coil H is energized.

The movable member D may or may not be provided with recesses on its plane face and the gap J between the skirt portion $D_1$ of the movable member and the fixed member C is as small as possible in order to minimize the required magnetization current.

The movable member D has a central axially extending stem portion W which fits inside a hollow shaft N which is coaxial with the fixed member C. There is a splined connection between the shaft N and the stem W by means of keys X and corresponding grooves. A packing gland $W_1$ provides a fluid-tight seal between the shaft and stem. A spring K in the hollow shaft N presses against the end of the stem W and thereby tends to move the movable member D toward its outer position, as shown in Fig. 1.

When the coil H is energized, the axially slidable rings A and B are drawn toward the coil, i. e. to the right in Fig. 1, thereby causing the rings to stack up and to be drawn into engagement with one another so that both faces of each ring (except the first and the last) are in engagement with adjacent rings. A conventional stop member U prevents the inner most ring A from being pulled off its splined and a stop member V is provided on the movable member D to limit the movement of the outermost ring B toward the left. The magnetic force also tends to move the movable member D toward the right against the action of the spring K. When the coil is de-energized, the spring K tends to move the movable member D back toward the left so that frictional engagement of the movable member with the rings B assists the normal disengagement of the rings.

A union L is provided through which the oil forced into the device can flow out of the casing while a bearing M makes the apparatus fluid-tight at its opposite end and, at the same time, centers the shaft N on which the member D is keyed.

Oil is led into the device through the hollow shaft N and axial duct O in the stem portion W, radial ducts P and ducts Q which run parallel with the surface of the skirt portion $D_1$ of the movable member D. From the ducts Q, the oil is thrown out through orifices R which communicate with said ducts Q and open into the spaces between the rings A and B for the purpose of cooling the rings.

The device as a whole is mounted rigidly or resiliently within a fixed part S.

The apparatus is associated with any suitable device, such as a resistor, by means of which it can be switched on or off and the current in the coil H can be controlled so that any desired braking torque is obtained.

What I claim as my invention and desire to secure by Letters Patent is:

1. An electromagnetic braking device which comprises a fixed annular U-sectioned yoke, an energizing coil housed in the bottom of the U, a hollow rotary shaft mounted coaxial with said yoke, a cup-shaped member comprising a shaft keyed in the free end of said hollow shaft and an apertured skirt portion extending between the legs of said U-sectioned yoke, a set of inwardly-projecting and longitudinally movable flat rings carried by the outer leg of said yoke, a further set of outwardly-projecting and longitudinally movable flat rings carried by the skirt portion of said cup-shaped member and interleaved with the inwardly-projecting rings carried by the outer leg of the yoke, a casing to enclose said yoke together with said cup-shaped member, ducts being provided axially in the shaft, radially in the end wall of the cup-shaped member and longitudinally in the skirt portion of the latter to lead a cooling liquid through apertures in the skirt of the cup-shaped member into the space occupied by said interleaved rings, said casing being provided with an aperture to let out the liquid flowing thereinto from said space.

2. An electromagnetic braking device according to claim 1, in which splines provided on the inside of the outer leg of the U-sectioned yoke cooperate with notches in the outer edges of the first-mentioned set of rings and splines provided on the outside of the skirt portion of the cup-shaped member cooperate with notches in the inner edges of the last-mentioned set of rings.

GEORGES LEVESQUE DU ROSTU.

REFERENCES CITED

The following references are of record in the file of this patent:

UNITED STATES PATENTS

| Number | Name | Date |
|---|---|---|
| 854,720 | Dawson | May 28, 1907 |
| 1,271,401 | Weydell | July 2, 1918 |
| 1,746,365 | Schunemann | Feb. 11, 1930 |
| 2,057,876 | Berry | Oct. 20, 1936 |
| 2,267,114 | Lear et al. | Dec. 23, 1941 |